United States Patent [19]
Engle

[11] 3,751,116
[45] Aug. 7, 1973

[54] DECELERATION CONTROLLER FOR RAILWAY BRAKE SYSTEMS

[75] Inventor: Thomas H. Engle, Watertown, N.Y.

[73] Assignee: General Signal Corporation

[22] Filed: Jan. 27, 1972

[21] Appl. No.: 221,344

[52] U.S. Cl. .................................. 303/20, 303/3
[51] Int. Cl. .............................................. B60t 13/68
[58] Field of Search .............................. 303/3, 7, 20

[56] References Cited
UNITED STATES PATENTS
3,402,972  9/1968  Cooper et al. ..................... 303/20
3,507,542  4/1970  Cannella ............................. 303/7
3,537,758  11/1970  Buhler et al. ..................... 303/20

Primary Examiner—Duane A. Reger
Assistant Examiner—Stephen G. Kunin
Attorney—Austin P. Dodge, Harold S. Wynn et al.

[57] ABSTRACT

The disclosure concerns a railway brake controller which modulates the trainlined brake-controlling signal as required to maintain balance between a command force indicative of a desired rate of retardation and a feedback force developed by a liquid-filled column subject to the actual rate of retardation.

5 Claims, 1 Drawing Figure

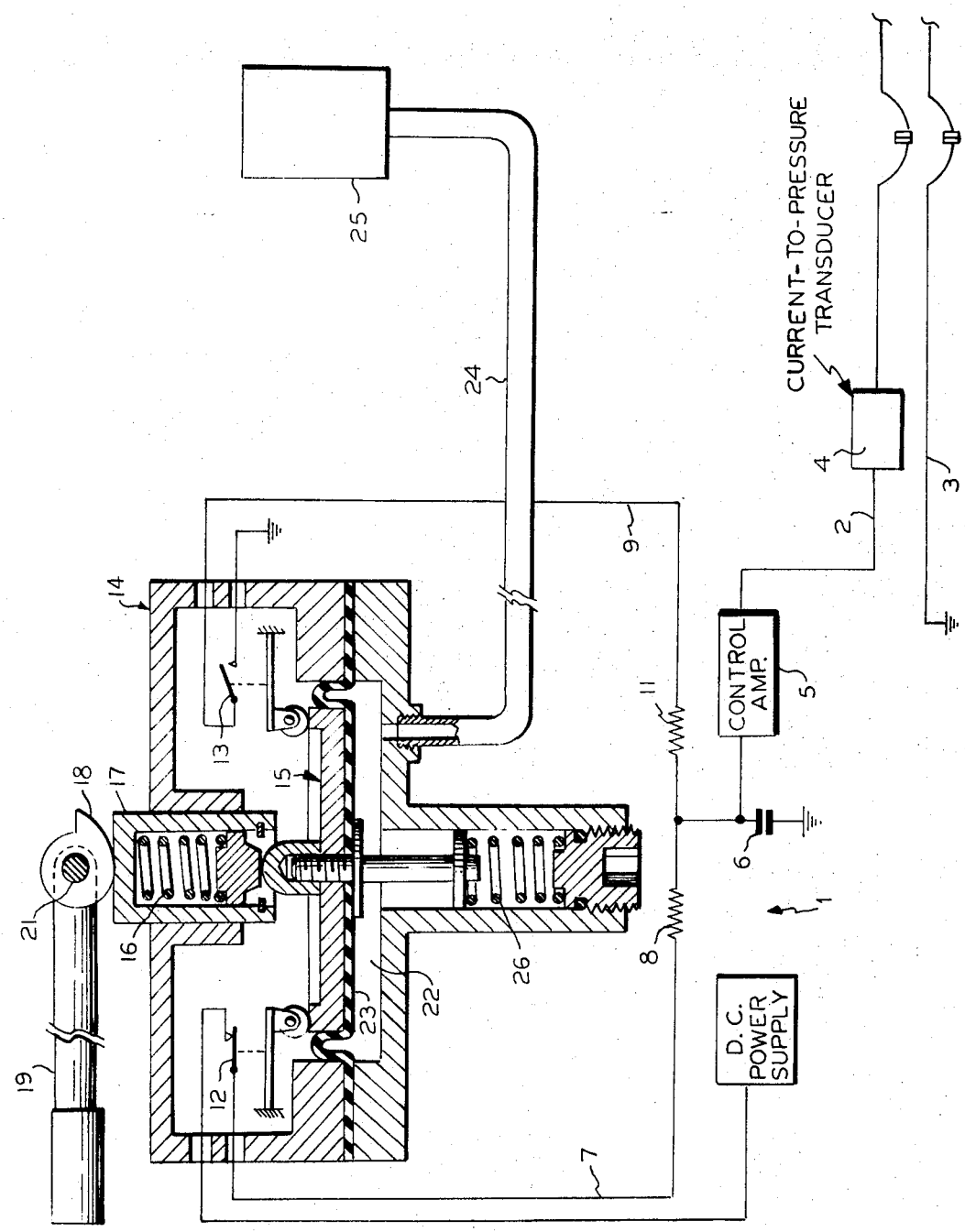

DECELERATION CONTROLLER FOR RAILWAY BRAKE SYSTEMS

BACKGROUND AND SUMMARY OF THE INVENTION

The prior art in the field of railway brake systems offers several proposals including a self-nulling controller which regulates the trainlined brake signal as required to match input and feedback signals indicative, respectively, of desired and actual rates of retardation. However, in all of the prior schemes of which I am aware, the deceleration controller is a relatively complex mechanism and makes difficult the task of providing adequate damping for the inertia mass which is used to sense the actual rate of retardation.

The object of this invention is to provide an improved deceleration controller which is simpler than its prior art counterparts and which facilitates incorporation of damping for the inertia mass. According to the invention, the controller includes apparatus for developing input and feedback forces representing, respectively, the selected and the actual rates of retardation, a comparator or balancing member which is moved in opposite directions from a null position in accordance with the sense of any difference between these forces, and a braking signal generator which alters the signal applied to the trainlined transmitting link in a sense dependent upon the direction of movement of the comparator member. The feedback force is developed by a pressure responsive element, such as a diaphragm or a piston, which communicates with one end of a liquid-filled column which extends longitudinally of the train, and thus is subjected to a hydraulic pressure proportional to the actual deceleration of the train. This arrangement simplifies the structure of the controller, particularly in cases where the input force is developed by a spring having an adjustable seat and the signal generator employs a pair of electrical limit switches to detect movement of the comparator member. Moreover, since the column of liquid is the acceleration detection element, its motion can be damped easily and to the degree required using techniques known in the hydraulic arts.

BRIEF DESCRIPTION OF THE DRAWING

The preferred embodiment of the invention is described herein with reference to the accompanying drawing whose single FIGURE shows the improved controller in schematic form.

DESCRIPTION OF ILLUSTRATED EMBODIMENT

As shown in the drawing, the improved controller 1, which is located at the head end of the train, is incorporated in an electric current responsive brake system comprising a trainlined control wire 2 and a return conductor 3 which connect in a series circuit current-to-pressure transducers 4 carried by the cars. A suitable transducer is described in U.S. Pat. No. 3,528,709, granted Sept. 15, 1970. Current is supplied to circuit 2, 3 by DC amplifier 5 embodied in controller 1 and which responds to changes in the charge on a capacitor 6. The arrangement is such that, when capacitor 6 is charged to a predetermined maximum level, the control current will be a maximum, and each transducer 4 will vent the brake cylinder it controls. On the other hand, reductions in capacitor charge will produce proportional decreases in control current and cause the transducers to effect proportional increases in the braking pressure at each car.

Capacitor 6 is charged through a circuit 7 at a rate determined by the value of timing resistor 8, and is discharged through a circuit 9 at a rate dependent upon the value of timing resistor 11. These two circuits 7 and 9 are controlled by limit switches 12 and 13, respectively, which are incorporated in a force comparator unit 14 and are actuated in reverse senses by a piston-diaphragm assembly 15. This assembly has an intermediate null position in which both of the switches 12 and 13 are open, and is shifted in opposite directions from this position to close one or the other of these switches by the differential between two opposed, variable control forces which act upon it. The first control force is an input or command signal representative of the desired rate of retardation, and it is developed by a coil compression spring 16 equipped with an adjustable seat 17 which is positioned by a cam 18 attached to a manually actuated handle 19. The force exerted by spring 16 is a minimum when handle 19 is in the illustrated release position, and it increases progressively as the handle is swung in the clockwise direction about pivot 21. The second variable control force is a feedback signal representative of the actual rate of retardation of the train, and it is developed by the hydraulic pressure in chamber 22 which acts upon the lower face of diaphragm 23. Chamber 22 communicates with one end of a tube or pipe 24 which extends longitudinally of the train from a vented liquid reservoir 25 positioned at an elevation high enough relative to unit 14 to insure that the pipe and chamber 22 are maintained liquid-filled. Since the liquid in pipe 24 is the acceleration detector, it must be free-flowing under the extreme temperature conditions encountered in railroad service, and preferably develops a control force on the order of 7 pounds per 1 mph/sec deceleration using a diaphragm 23 of reasonable size. A suitable arrangement employs a antifreeze composition, such as ethylene glycol, and a pipe 24 about 20 feet long.

It should be noted that, since slack action in the train or other operating conditions may cause the liquid column to develop pressure surges in chamber 22 which adversely affect the performance of controller 1, it might be necessary to damp movement of the liquid through pipe 24. If so, this can be accomplished easily using known techniques, such as a viscous damping pipe section of reduced cross section or sharp edged orifice. In cases where only unidirectional damping is needed, the damper may be equipped with a by-pass controlled by a check valve, or a one-way fluidic type of damper may be employed.

In addition to the two variable control forces, assembly 15 also is subjected to the substantially constant biasing force developed by a coil compression spring 26. This force is just sufficient to maintain assembly 15 in the illustrated release position when handle 19 is in its release position.

When the system is in service, and handle 19 is in the release position, assembly 15 will assume the illustrated position under the action of spring 26 and hold switches 12 and 13 closed and opened, respectively. Therefore, capacitor 6 will be maintained fully charged through circuit 7, and amplifier 5 will establish a maximum control current in the trainlined circuit 2, 3. As a result, the transducers 4 will effect venting of the brake cylinders on the cars, and thus maintain the brakes released.

In order to apply the brakes, the engineer swings handle 19 in the clockwise direction to a setting corresponding to the desired rate of retardation. This action increases the load in spring 16 and causes it to shift assembly 15 downward through the null position to the application position in which switch 12 is open and switch 13 is closed. Capacitor 6 now commences to discharge through resistor 11, thereby causing amplifier 5 to decrease control current, and causing transducers 4 to gradually increase brake cylinder pressure. As the brakes begin to apply, the train will decelerate, and the liquid in pipe 24 will create an increasing hydraulic pressure in diaphragm chamber 22. This pressure develops a feedback force on diaphragm 23 which, together with the constant force exerted by spring 26, gradually moves assembly 15 upward. The feedback force is proportional to the actual rate of retardation, so, when this rate matches the selected rate, assembly 15 will move to the null position and open switch 13. This action terminates further discharging of capacitor 6; therefore, amplifier 5 will now maintain control current at its present level, and transducers 4 will maintain a corresponding pressure in the brake cylinders.

If the actual rate of deceleration of the train increases, or the handle 19 is moved to a lower setting, the forces acting on assembly 15 will be unbalanced in a sense that causes the assembly to shift upward to the release position. As a result, switch 12 will close, the charge on capacitor 6 will begin to rise, and amplifier 5 will increase the control current in circuit 2, 3. This, of course, causes transducers 4 to decrease brake cylinder pressure, and consequently reduce the rate of deceleration. When this rate is restored to the desired level, assembly 15 will return to null position, and the forces acting on it will again be in equilibrium.

On the other hand, if the actual rate of retardation decreases from the selected level, or handle 19 is moved to a higher setting, the forces acting on assembly 15 will be unbalanced in the opposite sense, and assembly 15 will move to application position and close switch 13. This action decreases the charge on capacitor 6, and thus effects a further increase in brake cylinder pressure, in the rate of retardation, and in the feedback force developed by the pressure in chamber 22. As before, assembly 15 will return to null position, and remain there in a state of equilibrium, when the actual rate of retardation is restored to the selected level.

If the train comes to a complete stop, the feedback pressure in chamber 22 will, of course, dissipate, and assembly 15 will move to and be held in the application position by the input force developed by spring 16. Therefore, at this time, the charge on capacitor 6 will be depleted, and amplifier 5 will reduce control current to a minimum. As a result, transducers 4 will raise brake cylinder pressure to the maximum level and effect a full service application of the brakes.

I claim:
1. A railway brake controller (1) for developing a variable braking signal in a trainlined signal-transmitting link (2,3) comprising
   a. a comparator member (15) movable in opposite directions from a null position;
   b. signal-generating means (5, 6, 12, 13) responsive to movement of the comparator member for applying the variable braking signal to said link (2,3), the generating means serving to change the signal in a sense to increase braking action when the comparator member moves in a first direction from null position and to change the signal in a sense to reduce braking action when the comparator member moves in the opposite direction;
   c. command means (16-19) connected to apply to the comparator member a variable input force whose magnitude is indicative of a desired rate of retardation and which urges the member in said first direction;
   d. pressure responsive feedback means (22, 23) connected to apply to the comparator member a force which opposes the input force; and
   e. a liquid-filled column (24) connected to the feedback means and serving to subject same to a hydraulic pressure whose magnitude is a function of the actual rate of retardation of the train.

2. A brake controller as defined in claim 1 in which
   a. the command means includes a compression spring (16) which acts between the comparator member (15) and an adjustable seat (17) and urges the member in said first direction, and means (18, 19) for moving the seat between low and high spring load positions; and
   b. the comparator member (15) is biased in said opposite direction by a second compression spring (26).

3. A brake controller as defined in claim 2 in which the signal-generating means includes a pair of electric switches (12, 13) which are actuated in reverse senses by the comparator member (15) as the latter moves in opposite directions from null position.

4. A brake controller as defined in claim 3 in which
   a. both switches (12, 13) are open when the comparator member (15) is in null position;
   b. the first switch (13) is closed when the comparator member (15) moves in the first direction from null position; and
   c. the second switch (12) is closed when the comparator member (15) moves in the opposite direction from null position.

5. A brake controller as defined in claim 2 in which the liquid-filled column comprises a pipe (24) extending longitudinally of the train and communicating at its opposite ends with the feedback means (22, 23) and a liquid reservoir (25).

* * * * *